United States Patent [19]

Van Steenburg

[11] Patent Number: 4,736,959
[45] Date of Patent: Apr. 12, 1988

[54] CONVERTIBLE CARRIAGE

[75] Inventor: Kip Van Steenburg, Sudbury, Mass.

[73] Assignee: Amatech Corporation, Concord, Mass.

[21] Appl. No.: 916,945

[22] Filed: Oct. 8, 1986

Related U.S. Application Data

[63] Continuation-in-part of Ser. No. 826,408, Feb. 5, 1986, Pat. No. 4,678,196.

[51] Int. Cl.$^4$ .................................... B62B 11/00
[52] U.S. Cl. .................... 280/30; 280/643; 280/47.4; 297/130; 297/DIG. 4
[58] Field of Search ............... 297/130, 131, 183, 377, 297/DIG. 4; 474/128, 130; 280/7.1, 7.12, 641, 642, 43.13, 43.14, 47.38, 47.41, 643, 30, 37, 47.4

[56] References Cited

U.S. PATENT DOCUMENTS

| | | | |
|---|---|---|---|
| 1,118,931 | 12/1914 | Hasley | 280/43.13 X |
| 1,688,579 | 10/1928 | Franks | 474/130 |
| 2,497,265 | 2/1950 | Leit et al. | 280/7.1 |
| 2,706,642 | 4/1955 | Yarnell | 280/643 |
| 2,720,911 | 10/1955 | Lantz | 297/234 X |
| 3,290,050 | 12/1966 | Ezquerra | 280/30 |
| 3,679,223 | 7/1972 | Sakal | 280/642 X |
| 4,321,784 | 3/1982 | Wood et al. | 280/43.13 X |

FOREIGN PATENT DOCUMENTS

| | | | |
|---|---|---|---|
| 420525 | 4/1947 | Italy | 280/642 |
| 421113 | 5/1947 | Italy | 280/37 |

OTHER PUBLICATIONS

"What's New for Your Car" *Popular Science* p. 58, Oct. 1986, Vitaloni Brestrom Stroller.

Primary Examiner—John J. Love
Assistant Examiner—Michael Mar
Attorney, Agent, or Firm—Joseph S. Iandiorio; Douglas E. Denninger

[57] ABSTRACT

A convertible carriage including a superstructure with a seat for carrying a person to be transported, and a number of wheels. The wheels are rollably supported by wheel support structure which is movably interconnected with the superstructure. The superstructure is rollably transportable when the wheel support structure and wheels are in an extended position. The carriage further includes a device for relocating the wheels concurrently between the extended position and a retracted position in the superstructure.

13 Claims, 5 Drawing Sheets

CONVERTIBLE CARRIAGE

RELATED APPLICATIONS

This application is a continuation-in-part of U.S. Ser. No. 826,408, filed Feb. 5, 1986 Child Car Seat Convertible into a Stroller, by Kip Van Steenburg now U.S. Pat. No. 678,196.

FIELD OF THE INVENTION

This invention relates to a wheeled carriage for transporting a person such as a child and more particularly to such a carriage having structure to retract the wheels concurrently to readily convert the carriage into a car seat.

BACKGROUND OF THE INVENTION

Nonconvertible car seats designed to support an infant or toddler are presently available. If a parent is taking the child along on a shopping trip, for example, the child is placed in the conventional child's car seat until the car arrives at the shopping center. Typically a separate stroller is opened up, and the child is physically transferred from the car seat to the stroller. Generally such strollers are collapsible, and must be manipulated to be converted into their full operating size and configuration. The removal of a sometimes uncooperative child from a car seat, in order to place the child in the stroller, is somewhat annoying, particularly if the child starts "acting up". Upon the return trip, the stroller has to be collapsed, to conveniently store it in the car, and the child, who may be sleeping, must be transferred back to the car seat.

One convertible stroller, described in U.S. Pat. No. 2,720,911 by Lantz, does not permit the child to remain in the stroller during conversion to a car seat. The wheels must be retracted independently, and each front wheel has its own locking mechanism which must be separately disengaged by hand. The stroller must be tipped onto its side or elevated well above the ground before the wheels can be positioned inside of the superstructure of the carriage. Further, the back rest element collapses during conversion and does not support the child in the car seat configuration.

SUMMARY OF INVENTION

It is therefore an object of this invention to provide an improved convertible carriage having wheels or other roller devices which are conveniently and concurrently retractable to convert the carriage into a car seat.

It is a further object of this invention to provide such a carriage which in one configuration is a car seat which is readily removable from the car without unstrapping the child from the seat, is easily converted into a stroller and, after use as a stroller, is convertable back to a car seat, again without disturbing the child.

It is a further object of this invention to provide such a carriage which can lock the wheels in an extended position utilizing a single locking mechanism.

It is a further object of this invention to provide such a carriage which can have a wheel base larger than the superstructure of the carriage yet can retract the wheels into the shorter superstructure in the car seat configuration.

This invention results from the realization that a truly effective stroller convertible into a car seat can be achieved by a carriage having wheels which extend concurrently to rollably transport the carriage and conveniently retract concurrently into a non-collapsing superstructure.

This invention features a convertible carriage. There are a superstructure including seat means for carrying a person to be transported, and a plurality of wheel means. The carriage further includes wheel support means, movably interconnected with the superstructure, for rollably supporting the wheel means to transport the superstructure when the wheel support means and said wheel means are in an extended position. Also included are means, operatively connected to the wheel housing means, for relocating the wheel means concurrently between the extended position and a retracted position in the superstructure.

In one embodiment, the wheel support means is a single, integral structure coupling together the wheel means. The structure may be a base member retractable into the superstructure. In another embodiment, the wheel support means includes a plurality of leg members, one for separately supporting each of the wheel means. The means for relocating may include first drive means for driving at least one leg member and corresponding wheel means between the extended and retracted position, and a second drive means for interconnecting the remaining leg members and the first drive means to drive the remaining leg members and corresponding wheel means between the extended and the retracted position. The first and second drive means respectively include first and second pulley means, each pulley means being operatively connected to at least one leg member, and the second drive means further includes cable means interconnecting the first and second pulley means to drive them and their corresponding leg members concurrently. The carriage may further include a locking mechanism for releasably locking the first drive means to secure the leg members in the extended position. The locking mechanism has as single element to which force is applied by an operator of the carriage to disengage the first drive means and the locking mechanism from each other. Further, the first drive means may include actuating means, connected to at least one of the leg members, to which force is applied by the operator for moving the leg member between the extended and the retracted position. The actuating means may be a cross member connected between two of the leg members.

In another embodiment, the superstructure includes means for receiving the wheel means in the retracted position, such as a cavity formed on each side of the superstructure by opposing walls, and the means for relocating moves the wheel means to rest and over the pans in the retracted position. The means for relocating may arcuately move each of the wheel means in a substantially vertical plane such that all the wheel means move in fore and aft directions relative to the superstructure. The seat means may include a rigid backrest member which may be adjustably pivotable relative to the remainder of the superstructure. The seat means remains usable during relocation of the wheel means between the extended and the retracted positions.

DESCRIPTION OF PREFERRED EMBODIMENTS

Other objects, features and advantages will occur from the following description of preferred embodiments and the accompanying drawings, in which.

This invention may be accomplished by a carriage which has a number of wheels which are moved concurrently between an extended position in which the carriage serves as a stroller and a retracted position in which the carriage serves as a car seat. The wheels may be supported by a single structure which retracts into superstructure of the carriage. Alternatively, each wheel is carried by a separate leg member. The leg members are interconnected by a pulley and cable system or other linkage so that movement of one or more leg members drives the remaining leg members to relocate the wheels concurrently between the extended and retracted positions.

Figure 1:
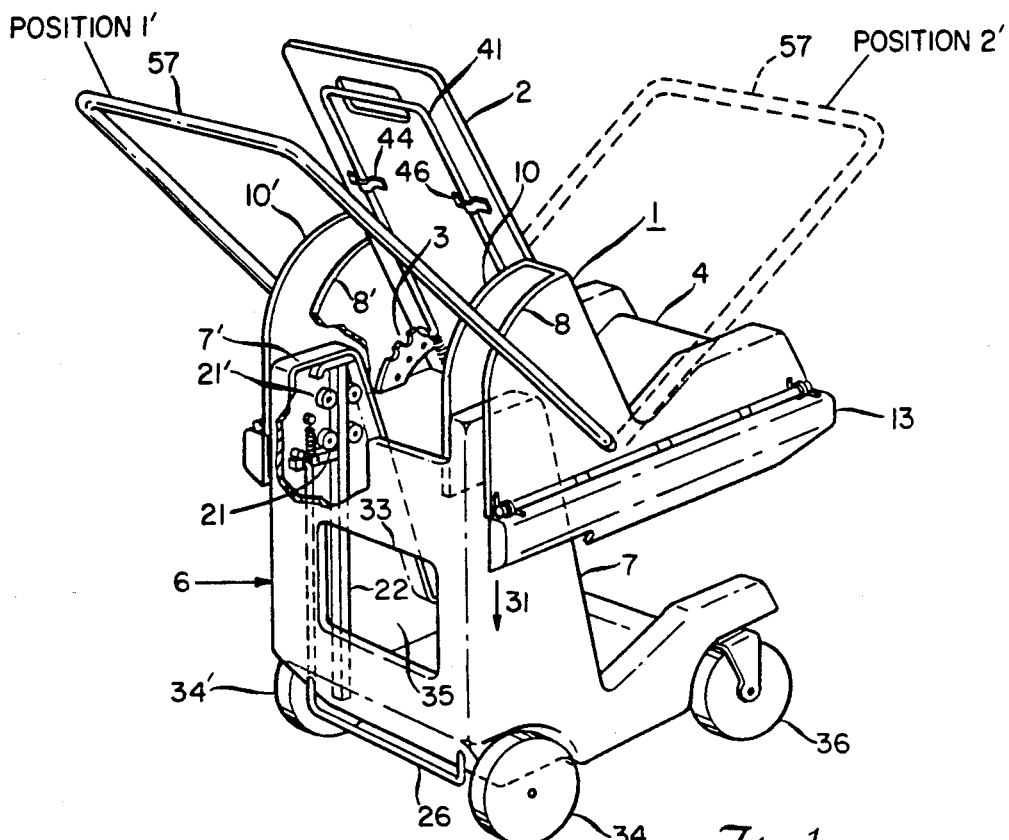
FIG. 1 is an axonometric, partial cutaway view of a convertible carriage according to this invention with its wheels in the extended position.

A carriage according to this invention having a single, integral structure for supporting its wheels is shown in FIG. 1. Superstructure 1 has an adjustable chair back member 2 which may be adjusted by a conventional rack type positioner, generally illustrated at location 3. A child supporting surface 4 is also illustrated. The superstructure 1 is configured to function in the manner of a car seat for transporting the child upon an automobile trip. Base member 6 is also shown, having a pair of upwardly extending members 7 and 7' interleaved between wall members 8, 10, 8' and 10' of the superstructure. The transporter illustrated in FIG. 1 is in the extended, stroller mode, whereby the superstructure 1 is separated from base member 6 as shown. The transporter is in the stroller mode, since the parent may readily push the transporter to convey the child along the ground. An extended U-frame pusher bar 57 may be placed in position 1' for pushing the transporter with the child facing in the direction of motion, or it may be placed in position 2' for pushing the transporter with the child facing the one pushing the stroller. During this second scenario the seat back 2 may be reclined to a horizontal position, thus converting the stroller to a pram.

Figure 2:
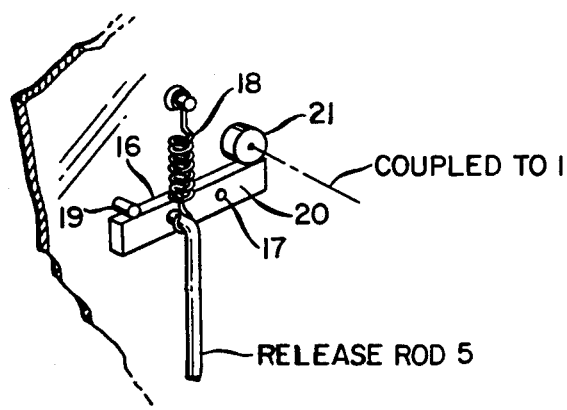
FIG. 2 is an enlarged view of the locking device shown in FIG. 1.

The locking mechanism shown in FIG. 1 is depicted enlarged in FIG. 2. The locking mechanism includes lock bar 16 pivotably coupled to the sidewall portion of the base member 6 by pivot pin 17. Locking bar 16 is upwardly spring biased by spring 18 against pin stop 19 which is also affixed to the side wall portion of base member 6. A single follower roller 21 is illustrated in FIG. 2, and all four track follower rollers are illustrated in FIG. 1, which ride upon track 22 affixed to base member 6. All follower rollers are rotatably coupled to superstructure 1 and aid in the easy relative motion of the superstructure with respect to the base.

Locking bar 16, coupled to base member 6, maintains superstructure 1 extended from base member 6 since track follower roller 21 supports the weight of superstructure 1 against locking bar 16. Thus gravity tends to urge roller 21 downwardly, to urge locking bar 16 clockwise against stop pin 19. When it is desirable to cause the transporter to be retractably telescoped to form a compact body which may be placed in the automobile, the parent manipulates the locking device by two distinct motions. The parent lifts superstructure 1 to enable downward motion of release rod 5, which permits counterclockwise rotation of locking bar portion 20 about pivot 17 to enable the roller followers 21 and 21' to clear the right-hand locking bar portion 20. A foot actuated bar 26 is directly coupled to lock release rod 5 to facilitate the application of a second force to the lock, after the user applies a first force against the superstructure in the upward direction to cause the track follower roller 21 to clear the locking bar 16. Superstructure 1 is thus permitted to descend toward the bottom portions of base member 6, to collapse the device. Thus, a convenient and yet safe mechanism is provided for collapsing the transporter, so that the child is never in danger of being injured by a sudden inadvertant release of the lock, to cause the superstructure to plummet downwardly.

A large opening 33 at the rear portion of the base member is also illustrated, opening into a storage area 35 for convenient storage of various items. Two wheels 34 and 36 are rotatably mounted to lower portions of base member 6. Two others are similarly mounted to the opposite side portion of the base member, wheel 34' being partially indicated. A seat belt, not shown, is also positioned upon the superstructure. Adjustment in the angle of the seatback 2 is effected by pulling up upon seatback release rod 41, to cause the lower portions thereof to clear the locking teeth of the release rod device 3; release rod guide members 44 and 46 are also indicated in FIG. 1. A conventional return spring, not shown, is also provided. The seat back may be reclined to a horizontal position for use as a pram.

Figure 4:
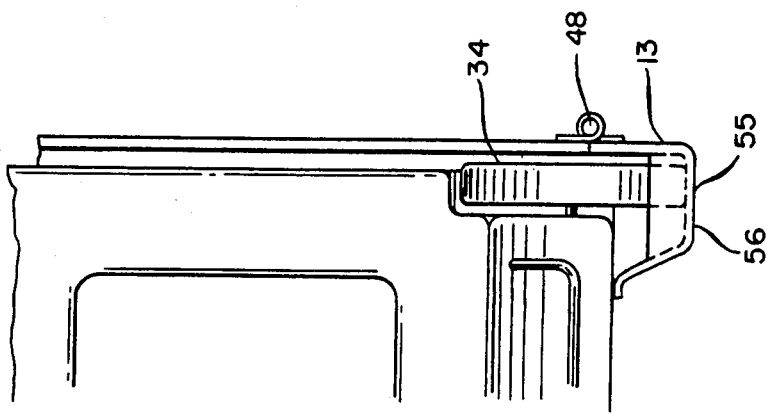
FIG. 4 is a partial end view, similar to that of FIG. 3, showing the carriage with the wheels in the retracted position and with the wheel covers now disposed beneath the wheels.
Figure 3:
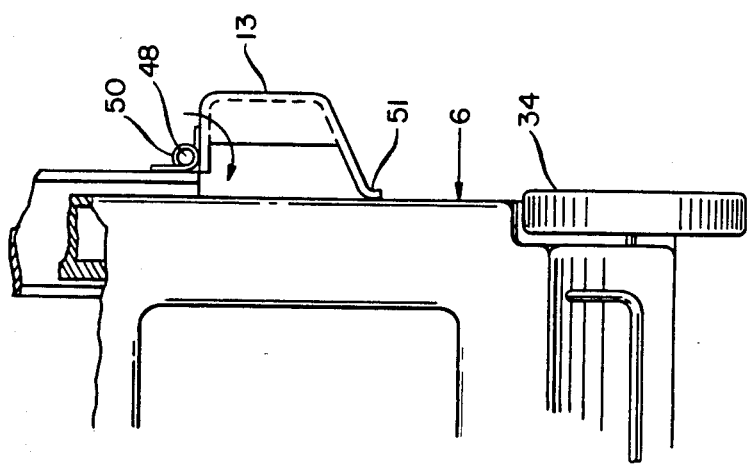
FIG. 3 is a partial end view of the carriage of FIG. 1.

One of the wheel cover members 13 of FIG. 1 is illustrated in greater detail in FIGS. 3 and 4. Wheel cover 13 is pivotably mounted along its extended length by means of a longitudinal pivot pin 48. A torsional spring 50 urges the wheel cover 13 in a clockwise direction so that the lower portion 51 of wheel cover 13 illustrated in FIG. 3 is urged against the side of the base member 6. Upon unlocking of the locking device, the superstructure moves downwardly toward the collapsed position, and the lower edge portion 51 of the wheel cover member continues to be urged against side portions of wheel 34, until it is able to be fully rotated in a clockwise direction by the above-mentioned torsion spring, to cause it to cover the rim of the wheel, as illustrated in FIG. 4. Thus when the now-collapsed transport is repositioned back into the car, the lower wheel portions are shielded from the car seat, and any debris which may have gathered about the wheels are captured, and do not soil the seat of the car. Also, owing to the configuration of the wheel covers, the transport is made more stable when positioned upon the car seat, compared to having the wheels alone press against upper portions of the car seat. When the transport is again removed from the car, and base member 6 extended from superstructure 1, the resulting reaction force of wheel 34 against the lower portions of the wheel cover at location 56 causes the wheel cover to rotate in a counterclockwise direction to clear the wheel, and again be spring-biased against the side portions of base member 6 as illustrated in FIG. 3. Wheel covers 13 may be described as folding wheel covers, since their rotation about the hinge pin 48 causes them to be automatically folded under the wheels as described.

Figure 5:
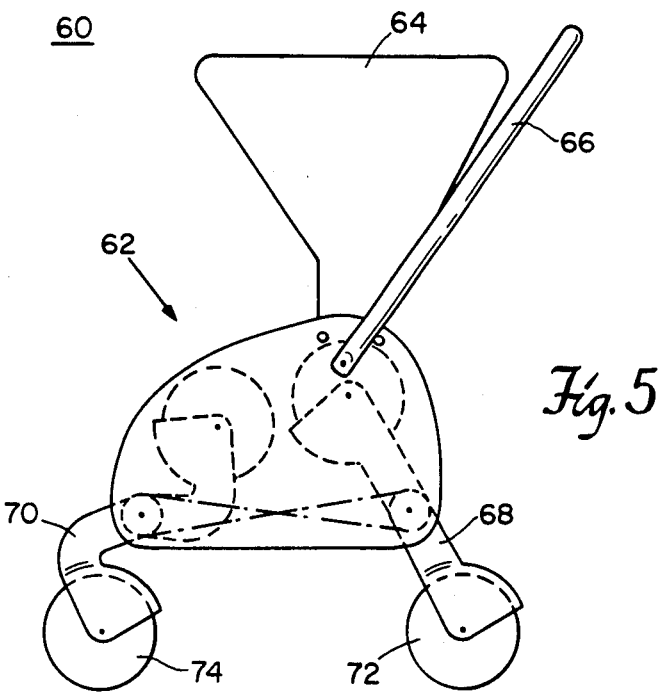
FIG. 5 is a side elevational view of an alternative carriage according to this invention showing the extended and retracted positions of the wheels.

An alternative convertible carriage 60 according to this invention is shown in FIG. 5. Carriage 60 includes superstructure 62 having canopy 64 and handle 66, shown in the stroller position. Leg members 68, 70 rotatably support wheels 72, 74, respectively, and are shown in the extended position. When carriage 60 is to be converted into a car seat, leg members 68, 70 and their corresponding wheels are concurrently relocated inside of superstructure 62 as shown in phantom.

This construction achieves a wheel base, that is, the front-to-back distance between wheels 74, 72, which is larger than the length of superstructure 62 when the wheels are in the extended position. The large wheel base provides increased stability when carriage 60 is used as a stroller, yet the wheels are retractable into superstructure 62 to provide a car seat which fits the typical gap of seventeen or eighteen inches between the rear seat and the aft portion of the front seat of many cars.

Figure 6:
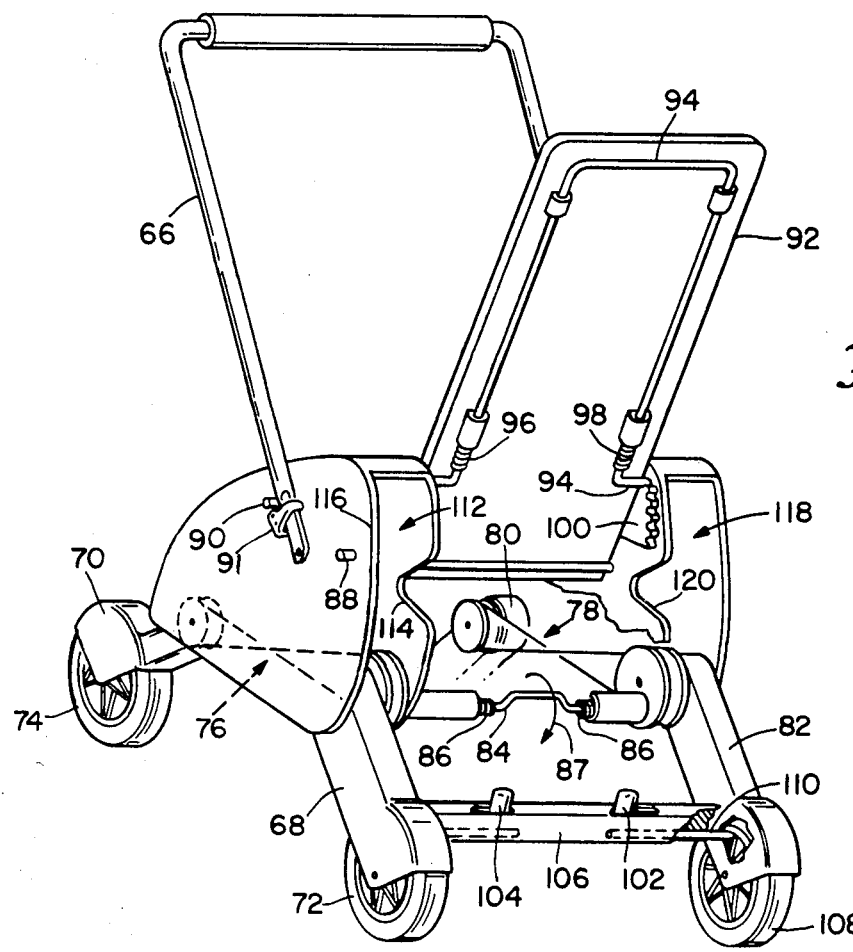
FIG. 6 is a partial-cutaway, axonometric view of the carriage of FIG. 5 with the canopy removed and the handle moved forward.

Carriage 60 is shown in greater detail in FIG. 6 with relocation system 76, shown in phantom, interconnecting leg members 68, 70, and relocation system 78 interconnecting leg members 80, 82. As described below, release bar 84 is actuated by the operator of carriage 60 to disengage leg member 68, 82 from the extended position which in turn releases leg members 70, 80. Torsion spring 86 resists forward rotation of release bar 84 and biases it in the direction indicated by arrow 87. Handle 66 is shown in the pram position locked onto stop 90 by latch 91 rather than on stop 88 as shown in FIG. 5. Backrest 92 is pivotably adjusted by pulling release bar 94 against biasing springs 96, 98 to disengage an end of rod 94 from teeth 100.

Carriage 60 can be arrested in position by sliding tabs 102, 104 within cross member 106 to engage wheels 72, 108. Cross member 106 is partially cut away to reveal rod 110 passing through the spokes of wheel 108.

In the retracted position, leg members 68, 70 rest within cavity 112 formed by parallel walls 114, 116. Similarly, leg members 80, 82 rest within cavity 118. Cross member 106 is received by recesses shown in walls 114, 120.

Figure 7:
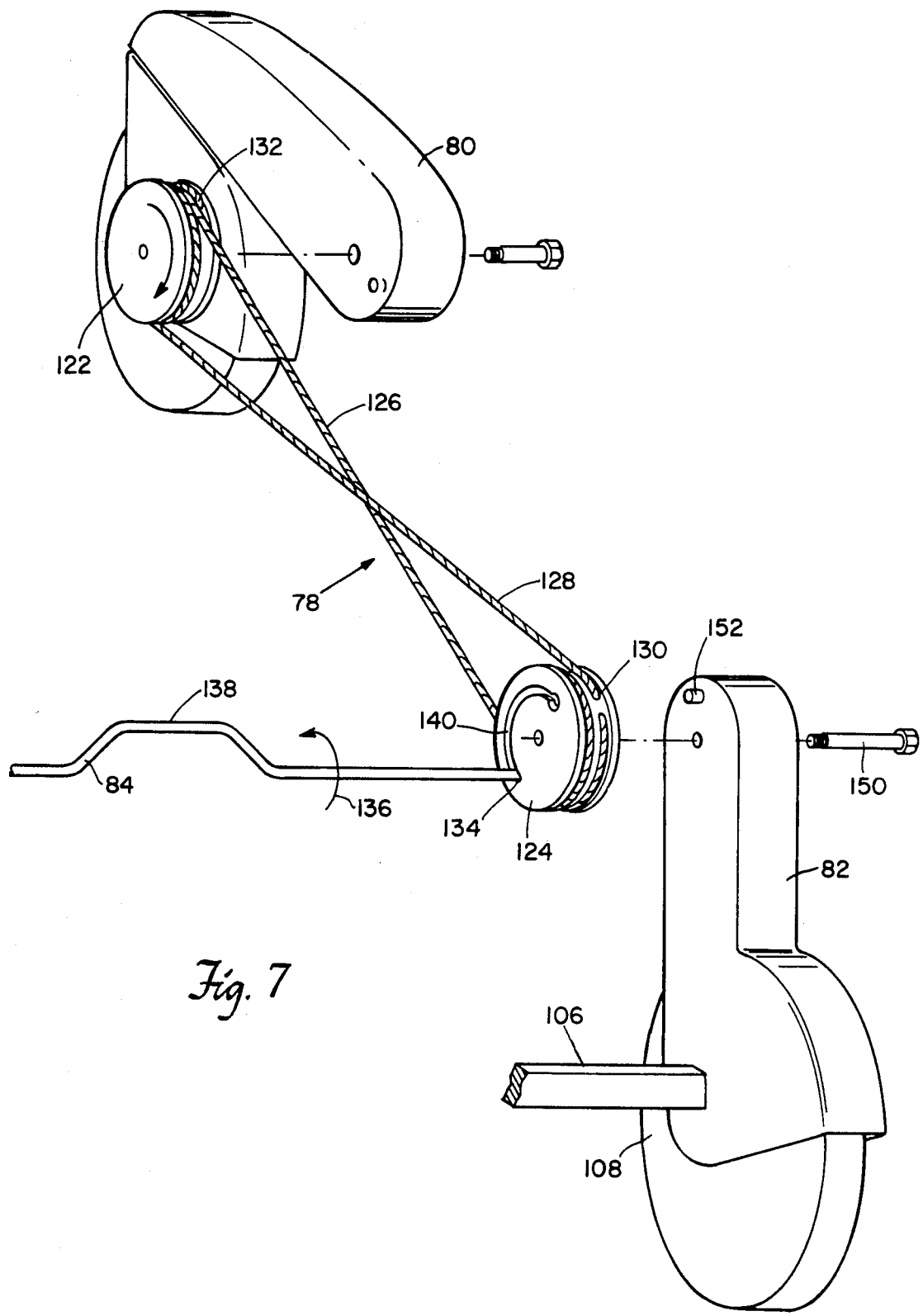
FIG. 7 is an exploded axonometric view of the windlass drums and cables of FIG. 6.

Relocation system 78 is shown in greater detail in FIG. 7 having pulleys 122, 124 serving as windlass drums for cables 126 and 128. Cable 128, for example, is connected at end 130 to pulley 124 and at end 132 to pulley 122. Cables 126, 128 lie within grooves passing around pulleys 122, 124.

When the leg members and wheels of carriage are in the extended position, one end of release bar 84 rests within hole 134 of pulley 124. Release bar 84 locks pulley 124 in this position, and cables 126, 128 restrain front pulley 122 to lock leg member 80 and its corresponding wheel in the extended position. Rotation of bar 84 in the direction of arrow 136, such as by placing the heel of a foot on cross member 106 and pressing with the toe against bend 138, frees pulley 124 to rotate such that bar 84, fixed in position relative to the superstructure, allows pulley 124 to rotate past it such that the end of bar 84 travels through groove 140 while the weight of superstructure 62 draws it toward the ground. The rotation of pulley 124 drives pulley 122 in the opposite direction through cables 126, 128. Leg members 68, 70, 80, 82 are thereby driven concurrently in the fore and aft directions, each moving arcuately in a vertical plane. Once superstructure 62 is resting on the ground, the operator lifts cross member 106 to place it within the recesses in walls 114, 120, FIG. 6. Leg members 70, 80 and their corresponding wheels are thereby also drawn within cavities 112, 118.

Figure 8:
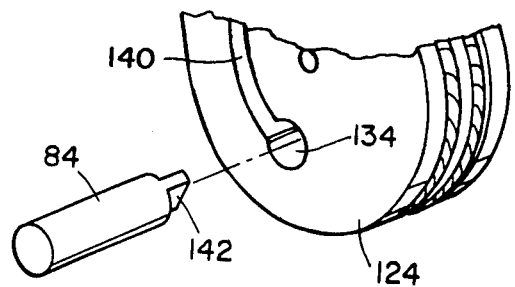
FIG. 8 is an enlarged view of a portion of the locking mechanism shown in FIG. 7.

The locking relationship of bar 84 and pulley 124 is shown in FIG. 8. Tab 142 is biased toward an orientation normal to groove 140 by torsion springs 86, FIG. 6. Rotation of bar 84, however, aligns tab 142 with groove 140 to allow rotation of pulley 124. The other end of bar 84 similarly engages the pulley associated with leg member 68.

Figure 9:
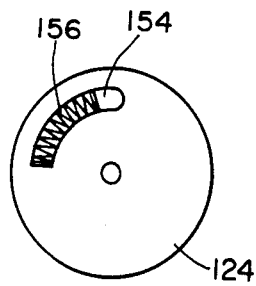
FIG. 9 is a side elevational view of the shock-absorbing device within one of the drums of FIG. 7.

Leg member 82, FIG. 7, and pulley 124 are rotatably secured to the superstructure by bolt 150. Post 152 slidably engages pulley 124 as shown in FIG. 9. Pulley 124 includes groove 154 which receives post 152. Compression spring 156 allows movement of pulley 124 and leg member 82 relative to each other to function as a shock absorber.

Figure 10:
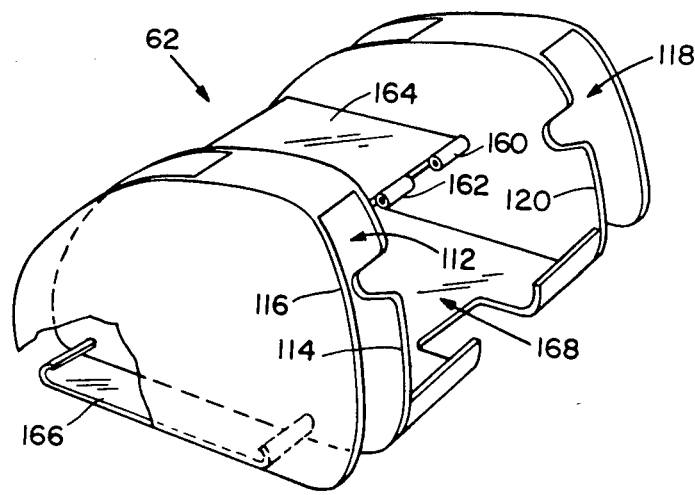
FIG. 10 is an enlarged view of the wheel recesses shown in FIG. 6.

The lower portion of superstructure 62 is shown in greater detail in FIG. 10. Guides 160, 162 support a pin passing through them and interlocking portions of backrest 92. Platform 164 serves as the seat. Pan 166 catches mud, dirt, or water which may drop from the wheels in the retracted position within cavity 112. Cavity 168 between walls 114, 120 serves as a storage area.

Lightweight, rigid materials are preferred for superstructure 62 and the leg members to facilitate lifting of the carriage and placement on the seat of a car. This invention is not limited to a cable and pulley system, but this drive arrangement is desired since it is light in weight. Alternatively, arrangements such as intermeshing plastic gears or other linkage can be utilized.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A convertible carriage comprising:
 a superstructure including seat means for carrying a person to be transported;
 a plurality of wheel means;
 wheel support means, movably interconnected with said superstructure, for rollably supporting said wheel means to transport said superstructure when said wheel support means and said wheel means are in an extended position below said superstructure;
 said wheel support means including a plurality of leg members, one for separately supporting each said wheel means, arranged in a front set and a back set each of said leg members having separate pivotal interconnections with said superstructure;
 means, operatively connected to said wheel support means, for relocating said wheel means concurrently between said extended position and a retracted position in said superstructure by driving said front set in the fore and upward direction during retraction and said back set in the aft and upward direction, said means for relocating including:
   first drive means for moving one of said front and back sets between said extended and said retracted positions, said first drive means including a drive member to which force is directly applied by an operator of the carriage; and
   second drive means for interconnecting the remaining set and said first drive means
to drive that other set between said extended and said retracted positions;
means for locking said leg members in said extended positions to extend outwardly and downwardly from said pivotal interconnections.

2. The carriage of claim 1 in which said first and second drive means respectively include first and second pulley means, each said pulley means being operatively connected to at least one leg member, and said second drive means further includes cable means interconnecting said first and second pulley means to drive said pulley means and their corresponding leg members concurrently.

3. The carriage of claim 1 in which said means for locking includes a locking mechanism for releasably locking said first drive means to secure said leg members in said extended position.

4. The carriage of claim 3 in which said locking mechanism has a single element to which force is applied by an operator of said carriage to disengage said first drive means and said locking mechanism from each other.

5. The carriage of claim 1 in which said superstructure includes means for receiving said wheel means in said retracted position.

6. The carriage of claim 5 in which said means for receiving includes, on each side of said superstructure, a cavity formed by opposing walls.

7. The carriage of claim 6 in which said means for receiving further includes a pan between each set of opposing walls, and said means for relocating moves said wheel means to rest above and over said pans in said retracted position.

8. The carriage of claim 1 in which said means for relocating arcuately moves each said wheel means in a substantially vertical plane.

9. The carriage of claim 1 in which said seat means includes a rigid back rest member.

10. The carriage of claim 9 in which said back rest member is adjustably pivotable relative to the remainder of said superstructure.

11. The convertible carriage of claim 1 in which said drive member is connected between the leg members of said back set and is directly actuatable by the foot of the operator.

12. A convertible carriage comprising:
   a superstructure including seat means for carrying a person to be transported;
   a plurality of wheel means;
   wheel support means, movably interconnected with said superstructure, for rollably supporting said wheel means to transport said superstructure when said wheel support means and said wheel means are in an extended position below said superstructure;
   said wheel support means including a plurality of leg members, one for separately supporting each said wheel means, arranged in a front set and a back set each of said leg members having separate pivotal interconnections with said superstructure;
   means, operatively connected to said wheel support means, for relocating said wheel means concurrently between said extended position and a retracted position in said superstructure by driving said front set in the fore and upward direction during retraction and said back set in the aft and upward direction, said means for relocating including:
      first drive means for moving said back set between said extended and said retracted positions, said first drive means including a drive member to which force is directly applied by the foot of an operator of the carriage to lift said back set into said retracted position; and
      second drive means for interconnecting said front set and said first drive means to drive said front set between said extended and said retracted positions; and
   a locking mechanism for engaging said means for relocating, said locking mechanism actuatable by the foot of the operator to disengage said wheel means from said extended position said locking mechanism locking said leg members in said extended positions to extend outwardly and downwardly form said pivotal interconnections.

13. The carriage of claim 12 in which said first and second drive means respectively include first and second pulley means, each said pulley means being operatively connected to at least one leg member, and said second drive means further includes cable means interconnecting said first and second pulley means to drive said pulley means and their corresponding leg members concurrently.

* * * * *